United States Patent
Cagle et al.

[15] 3,663,176
[45] May 16, 1972

[54] COLORIMETRIC OXYGEN DETECTORS

[72] Inventors: Glen E. Cagle; Donald R. Witt, both of Bartlesville, Okla.

[73] Assignee: Phillips Petroleum Company

[22] Filed: July 24, 1969

[21] Appl. No.: 844,637

[52] U.S. Cl. ............................. 23/232 R, 23/2 S, 23/254 R, 252/458
[51] Int. Cl. .......................................................... G01n 21/16
[58] Field of Search ..........................23/232, 254, 2 S, 230 M

[56] References Cited

UNITED STATES PATENTS

| | | | |
|---|---|---|---|
| 3,340,014 | 9/1967 | Neal et al. | 23/254 |
| 3,454,356 | 7/1969 | Raman | 23/2 S |
| 3,535,074 | 10/1970 | Nakashima | 23/2 S |
| 3,361,531 | 1/1968 | Erb et al. | 23/25 X |
| 2,959,578 | 11/1960 | Hogan | 252/458 X |

OTHER PUBLICATIONS

Mellor, Comprehensive Treatise on Inorganic and Theoretical Chemistry, Vol. 9, pp. 744, 754 (1929).
Mellor, Vol. 11, pp. 177, 178, 207 (1931).
Bennett, Concise Chemical and Technical Dictionary, pp. 216, 968 (1947).

*Primary Examiner*—Joseph Scovronek
*Attorney*—Young and Quigg

[57] ABSTRACT

An oxygen detector which undergoes a color change to indicate the presence of oxygen and certain oxygen-containing compounds in a gas stream in which the oxygen or the oxygen-containing compound can be present in a concentration of less than 1 parts per million which comprises a supported oxide of a metal of group VB or VIB of the periodic table, the metal being in a lower valence state.

8 Claims, No Drawings

COLORIMETRIC OXYGEN DETECTORS

This invention relates to colorimetric detectors.

In one of its more specific aspects, this invention relates to detecting materials which undergo color change to indicate the presence of an extraneous material.

The use of materials which undergo color change for detection of the presence of an extraneous material is well known. Such materials are particularly valuable when they are employable for the purpose of removing those components to which they are sensitive from gas streams in which the extraneous gas is present in minute quantities. Such materials are additionally valuable if the extent of their color change can be employed to determine the quantity of the extraneous material in the gas stream.

This invention provides such materials and the methods for their production and use.

According to the method of this invention, there is provided a process for detecting the presence of oxygen in a gaseous stream which comprises contacting said stream with a composition comprising a supported oxide of a metal of group VB or VIB of the periodic table [Handbook of Chemistry and Physics, Chemical Rubber Co., 45th Edition (1964), p. B-2] in a lower valence state to effect a color change in the composition.

The oxygen may be present as molecular oxygen or as oxygen in the form of sulfur and nitrogen oxides such as $SO_2$, $N_2O$ and $NO_2$.

Accordingly, it is an object of this invention to provide materials suitable for removal of minute traces of components from gaseous streams.

It is another object of this invention to provide agents for the quantitative measurement of components contained in gaseous streams in minute quantities.

This invention contemplates use of a salt or mixture of salts of the metals of groups VB or VIB in the preparation of the detectors. These metals include vanadium, niobium, tantalum, chromium, molybdenum, and tungsten. Preferably, the applicable compounds of these metals are the halides, sulfates, nitrates, oxides, oxyhalides, oxysulfates and phosphates. Preferred compounds for use in nonaqueous solvents are organometallic compounds such as those recited in the Handbook of Chemistry and Physics, Chemical Rubber Company, 48th edition (1967-1968), pp. C-650 through C-685. Particularly preferred compounds are the carbonyl compounds and the bis-cyclopentadienyl compounds. The compounds used are at least slightly soluble in an aqueous or nonaqueous medium in order to facilitate their deposition on the support.

Preferred supports are silica-containing supports such as silicas and silica-aluminas although the nature of the support is not of primary importance. To facilitate the usage in the conventional manner, the support is preferably particulate.

A group VB or VIB metal compound is deposited on the particulate support from a solution chosen in consideration of the solubility of the metal compound therein. For example, suitable nonaqueous solvents are aromatics, esters, ketones, paraffins, cycloparaffins, and the like. Any aqueous or nonaqueous solution is satisfactory which deposits the metal compound on the support to give a concentration of metal in the range of from about 0.01 to about 10 weight per cent, preferably from about 0.1 to about 5 weight per cent of the weight of the combined support and compound. The feasible concentration is largely dependent upon the concentration of the gas to be detected in the gaseous stream. Predrying of the support is desirable when a nonaqueous solution of the metal compound is used, but it is not necessary when an aqueous solution is used. However, in either instance, the preparation can be dried and the compound converted to an oxide by maintaining at about 1,000° to 1,400° F. in air for a period of about 1 to 5 hours.

The resulting oxide is then reduced with hydrogen or carbon monoxide by passing the reducing agent in contact with the particulate solid for about 1 minute to about 10 hours at temperatures of from about 350° to about 1,500° F. at space velocities of from about 100 to about 10,000 volumes of gas per volume of particulate solid. However, these ranges are only the most practical inasmuch as given enough time, almost any space velocities can be employed.

If hydrogen is employed to reduce the detector, the detector can be employed in detecting oxygen in gas streams which contain olefins, inasmuch as the detector will not act to polymerize the olefins. However, if carbon monoxide is employed to reduce the detector, the reduced detector, when employed for the detection of oxygen in olefin streams, will tend to polymerize the olefins. For this reason, detectors intended for determination of oxygen in olefin streams and which have been reduced by carbon monoxide, will be contacted by flue gas, steam, or steam including inert diluents in order to inactivate the detector in respect to polymerizing olefins. Such inactivation is necessary only when the detector is to be contacted in use by a stream containing olefins.

This procedure forms a supported oxide compound which is capable of existing in two oxide states of different valences and of perceptibly different colors, the compound undergoing a change in color upon contact with oxygen, or oxygen-containing compounds, at ambient temperatures.

The following examples will illustrate the invention.

About 0.75 part by weight of $VOSO_4$ was dissolved in about 42 parts by weight of deionized water. About 9.4 parts by weight on a dry basis of finely-divided silica are added to the solution and the resulting mixture was evaporated to dryness and the residue was dried at 1,000° F. for 2 hours. The dried residue was light yellow.

The dried residue was reduced for about 30 minutes at 1,000° F. in a stream of carbon monoxide and then flushed with nitrogen for about 40 minutes. The reduced detector was violet in color. A portion of this detector was placed in a glass tube having a diameter of 8 mm. and flow of a nitrogen stream containing about 1 part per million oxygen was routed therethrough. The detecting compound underwent a change in color from violet to light yellow, there being a column 2.0 mm. in length changing color for each 10 cubic feet of gas passed across the detector. Regeneration of the detector to its reduced form in the manner previously described was accomplished thereafter, after which reuse of the detector was possible.

In another instance, a finely-divided silica support having thereon 1.3 weight per cent $CrO_3$ deposited from aqueous solution by the aforementioned procedure was dried for about 5 hours at 1,400° F. after which it was reduced by contacting with carbon monoxide at 750° F. for 30 minutes. The reduced material was flushed with nitrogen and possessed a blue color. Two quantities of the reduced material were placed in separate glass tubes, each tube having a diameter of 8 mm. Each quantity of the reduced material was then contacted with a nitrogen stream containing oxygen in the amount of 9 parts per million. Under these conditions, a zone of the detecting material was altered in color from blue to yellow, the rate of interface travel between the two color zones being 1.04 mm. per part per million of oxygen. Similarly, quantities of this material were contacted with a nitrogen stream containing 33 parts per million of oxygen. In this instance, a zone of the detector material again underwent a change in color from blue to yellow. The rate of interface travel between the two zones in this instance was 1.08 mm. per part per million oxygen.

In both instances the detector was regenerable, undergoing a reverse color change, upon reduction and upon retesting indicated a comparable rate of interface travel between color zones.

For detection of $N_2O$, $NO_2$ and $SO_2$, the preparation of the detecting compounds and their reduction are as previously recited. In this instance, $CrO_3$ on silica, reduced in carbon monoxide to a blue colored material, underwent the following changes in color in detecting the materials indicated:

$NO_2$—blue to orange-brown to orange
$N_2O$—blue to orange
$SO_2$—blue to green The above data indicate the preparation of a suitable oxygen determining agent from group VB and VIB metals and the use of such agents to detect and to analyze for oxygen and oxygen-containing gases in gases in which they are present in minute quantities.

Certain modifications will be evident from the above discussion. Such however, are considered to be within the skill of the art.

What is claimed is:

1. A method for determining the presence of oxygen in an olefin-containing stream in the absence of substantial polymerization of the olefin, said oxygen being present in said stream in the form of molecular oxygen, $SO_2$, $N_2O$ and $NO_2$, which method comprises contacting said stream at ambient temperatures with a colorimetric oxygen detector composition comprising a supported metal oxide which undergoes a color change upon contact with said olefin-containing stream, said color change being quantitatively related to the quantity of oxygen present in said stream, said colorimetric oxygen detector composition having been prepared by:
   a. impregnating a particulate silica-containing support with a solution comprising a compound of a metal selected from the group consisting of chromium, molybdenum, tungsten, niobium, and tantalum in an amount sufficient to deposit 0.01 to about 10 weight percent of said metal on said support;
   b. calcining the impregnated support by heating in the presence of air to convert said compound to an oxide of said metal; and
   c. reducing the metal oxide obtained in (b) by contacting with hydrogen to produce said colorimetric oxygen detector composition, at least a portion of said metal being in a lower valence state so that said detector undergoes a color change upon contact with oxygen or said oxygen-containing compounds.

2. The method of claim 1 in which said metal is chromium and said compound of said metal is at least one selected from the group consisting of halides, sulfates, nitrates, oxides, oxyhalides, oxysulphates, phosphates, carbonyls and bis-cyclopentadienyls.

3. The method of claim 1 in which said hydrogen is passed into contact with said oxide at a space velocity within the range of from about 100 to about 10,000 volumes of hydrogen per volume of said support.

4. The method of claim 1 in which said solution comprises $CrO_3$ in water and in which said support is particulate silica.

5. A method for determining the presence of oxygen in an olefin-containing stream in the absence of substantial polymerization of the olefin, said oxygen being present in said stream in the form of molecular oxygen, $SO_2$, $N_2O$ and $NO_2$, which comprises contacting said stream at ambient temperatures with a colorimetric oxygen detector composition comprising a supported metal oxide which undergoes a color change upon contact with said olefin-containing stream, said color change being quantitatively related to the quantity of oxygen present in said stream, said colorimetric oxygen detector composition having been prepared by:
   a. impregnating a particulate silica-containing support with a solution comprising a compound of a metal selected from the group consisting of chromium, molybdenum, tungsten, niobium, and tantalum in an amount sufficient to deposit 0.01 to about 10 weight percent of said metal on said support;
   b. calcining the impregnated support by heating in the presence of air to convert said compound to an oxide of said metal;
   c. reducing the metal oxide obtained in (b) by contacting with carbon monoxide, at least a portion of said metal being in a lower valence state so that said detector undergoes a color change upon contact with oxygen or said oxygen-containing compound; and
   d. contacting the carbon monoxide reduced metal oxide formed in step (c) with a gas selected from the group consisting of flue gas, steam and nitrogen to inactivate said metal oxide for the polymerization of olefins and produce said colorimetric oxygen detector composition.

6. The method of claim 5 in which said metal is chromium and said compound of said metal is at least one selected from the group consisting of halides, sulfates, nitrates, oxides, oxyhalides, oxysulphates, phosphates, carbonyls and bis-cyclopentadienyls.

7. The method of claim 5 in which said carbon monoxide is passed into contact with said oxide at a space velocity within the range of from about 100 to about 10,000 volumes of hydrogen per volume of said support.

8. The method of claim 5 in which said solution comprises $CrO_3$ in which said support is particulate silica.

* * * * *